United States Patent
Lambert et al.

(10) Patent No.: US 6,192,324 B1
(45) Date of Patent: *Feb. 20, 2001

(54) ON-BOARD DIAGNOSIS OF EMISSIONS FROM CATALYTIC CONVERTERS

(75) Inventors: David Kay Lambert, Sterling Heights; Galen Bruce Fisher, Bloomfield Hills; Harold E. Durling, Elsie, all of MI (US)

(73) Assignee: General Motors Corporation, Detroit, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/515,076

(22) Filed: Aug. 14, 1995

(51) Int. Cl.$^7$ ........................................ B60Q 1/00
(52) U.S. Cl. ............................. 702/183; 60/274
(58) Field of Search ................... 364/500, 496, 364/550, 499, 551.01, 528.06, 528.07; 73/23.31, 118.1, 24.01; 422/88, 90, 94, 180; 60/274, 276, 277; 340/439, 438, 633, 634; 702/22–24

(56) References Cited

U.S. PATENT DOCUMENTS

| | | | |
|---|---|---|---|
| 3,630,072 | * 12/1971 | Traver | 73/23.31 |
| 3,674,441 | 7/1972 | Cole | 422/109 |
| 3,766,536 | 10/1973 | Hile | 340/229 |
| 5,125,231 | * 6/1992 | Patil et al. | 60/274 |
| 5,142,184 | 8/1992 | Kane | 313/309 |
| 5,177,464 | 1/1993 | Hamburg | 340/439 |
| 5,265,417 | * 11/1993 | Visser et al. | 60/274 |
| 5,296,196 | * 3/1994 | Takeshima | 422/94 X |
| 5,375,414 | * 12/1994 | Adamczyk, Jr. et al. | 60/274 |
| 5,408,215 | * 4/1995 | Hamburg | 73/118.1 X |
| 5,492,679 | * 2/1996 | Ament et al. | 422/180 |
| 5,524,433 | * 6/1996 | Adamczyk, Jr. et al. | 60/276 |

OTHER PUBLICATIONS

Buhrmaster et al, "Evaluation of In–line Adsorber Technology", SAE Paper #97067, pp. 39–43 No date.

Ballinger et al, "Hydrocarbon Trap Technology for the Reduction of Cold–Start Mydrocarbon Emissions", SAE Paper #97041, pp. 27–31 No date.

Basic Research Needs for Vehicles of the Future, An Integrated Perspective of Academic, Industrial, and Government Researchers, "Sensors for Control, Performance, and Emissions" pp. 39–43, copyright 1995 by Princeton University. No month.

Noda et al, "In–line Hydrocarbon (HC) Adsorber System for Cold Start Emissions", SAE Paper #970266, pp. 31–38 No date.

"SAAB: New Bag Controls Highly Toxic Exhaust Output", Automotive News Europe Apr. 29, 1996.

Birch "Gas Bag" Automotive Engineering, Aug. 1996, p. 50.

Valenti "Bagging Car Exhausts" Mechanical Engineering, Sep. 1996, p. 26.

(List continued on next page.)

Primary Examiner—Melanie A. Kemper
(74) Attorney, Agent, or Firm—Vincent A. Cichosz

(57) ABSTRACT

This invention is an on-board means to verify that a vehicle's exhaust emissions control system functions normally. It monitors hydrocarbon (HC) exhaust emissions for a few minutes after a cold start or at other selected times. If used from cold start, it is an on-board approximation to taking the first bag sample in an FTP test. The measurement involves storing a portion of the exhaust HC. Various embodiments are discussed. Some involve measuring the cumulative amount of stored HC (as on a substrate) during the test. Other embodiments wait until the end of the test to measure the amount of stored HC. At the end of each test (or trip), the storage means is returned to an empty state to await the next test. If HC is stored on or in a substrate, for example, the temperature of the substrate is raised. This decreases the amount of stored HC vapor and renews the substrate for the next test.

7 Claims, 6 Drawing Sheets

OTHER PUBLICATIONS

See Attached Sheets 2–4.

Clemmens et al, "Detection of Catalyst Performance Loss Using On–Board Diagnostics," U.S. Environmental Protection Agency, SAE Paper No. 900062, pp. 1–18.

Koupal et al, "Detection of Catalyst Failure On–Vehicle Using the Dual Oxygen Sensor Method," U.S. Environmental Protection Agency, SAE Paper No. 910561, pp. 135–146.

Hepburn et al, "The Relationship Between Catalyst Hydrocarbon Conversion Efficiency and Oxygen Storage Capacity," Ford Motor Co., SAE Paper No. 920831, pp. 1–7.

Finlay et al, "Fast Response FID Measurement of Unburned Hydrocarbons in the Exhaust Port of a Firing Gasoline Engine," National Engineering Laboratory, Scotland, UK, SAE Paper No. 902165, pp. 137–146.

Bianchi et al, "Determination of Efficiency of Exhaust Gas Catalyst by F.T.I.R. Spectroscopy," Universite Claude Bernard Lyon I, France: E.C.I.A., France; SAE Paper No. 910839, pp. 207–211.

Gopel et al, "Sensors A Comprehensive Survey," vol. 1 Fundamentals and General Aspects, ISBN 3–527–26767–0 (VCH, Weinheim, Germany), ISBN 0–89573–673–X (VCH, New York), pp. 382–405.

Akridge et al, "Thin Film Solid State Ionic Gas Sensors," Solid State Microbatteries, 1990 Plenum Press, New York and London, Published in cooperation with NATO Scientific Affairs Division, pp. 395–405.

Visser et al, "Sensors for Measuring Combustibles in the Absense of Oxygen," Research Staff, Ford Motor Co., Transducers '91, 1991 International Conference on Solid–State Sensors and Actuators, Digest of Technical Papers #91CH2817–5, pp. 555–557.

Joseph Theis, "Catalytic Converter Diagnosis Using the Catalyst Exotherm" AC Delco Systems Division of GMC, SAE Paper No. 942058, pp. 1–15.

Townes et al, "Microwave Spectroscopy," Dover Publications, Inc., New York 1975, p. 498.

Varanasi et al, "Measurements of Intensities and Nitrogen–Broadened Linewidths in the CO Fundamental at Low Temperatures," J. Quant. Spectrosc. Radiat. Transfer, vol. 15, pp. 473–482, Pergamon Press 1975, Printed in Great Britain.

Chackerian, Jr. et al, "CO 1–0 Band Isotopic Lines as Intensity Standards," J. Quant. Spectrosc. Radiat. Transfer vol. 30, No. 2, pp. 107–112, 1983, Printed in Great Britain.

Wolfe et al, "The Infrared Handbook," Prepared by The Infrared Information and Analysis (IRIA) Center, Environmental Research Institute of Michigan for the Office of Naval Research, Department of the Navy, Washington DC, 1978, pp. 1–22.

Angell et al, "Infrared Spectroscopic Investigations of Zeolites and Adsorbed Molecules. II. Adsorbed Carbon Monoxide," Infrared Studies of Zeolites and Adsorbed Molecules, The Journal of Physical Chemistry, vol. 70, No. 5, May 1966, pp. 1413–1418.

McLeod et al, "A Sampling System for the Measurement of PreCatalyst Emissions from Vehicles Operating Under Transient Conditions," General Motors Corp./Ford Motor Co./Chrysler, SAE Paper No. 930141, pp. 1–8.

Sasayama et al, "A New Electronic Engine Control System Using a Hot–Wire Air Flow Sensor," Hitachi Res. Lab., Hitachi, Ltd., Tokyo, Japan, SAE Paper No. 820323, pp. 87–94.

Sasayama et al, "A Solid–State Air Flow Sensor for Automotive Use," Sensors and Actuators, 4(1983) 121–128.

Yan et al, "Molecular recognition on acoustic wave devices: zeolite thin films coated with organosilane gate layer," Department of Chemistry, Purdue University, West Lafayette, IN 47907 USA, Microporous Materials, 1(1993) 401–411.

Schuetzle et al, "Fundamentals and Applications of Chemical Sensors," Ford Motor Co., ACS Symposium Series 309, American Chemical Society, Washington DC (1986), pp. 245–255.

John O'M. Bockris, "Electrochemistry of Cleaner Environments," Electrochemistry Laboratory, John Harrison Laboratory of chemistry, University of Pennsylvania, Philadelphia, Pennsylvania, Plenum Press, New York–London (1972), p. 178.

Baresal et al, "Influence of Catalytic Activity on Semiconducting Metal Oxide Sensors I. Experimental Sensor Characteristics and Their Qualitative Interpretation," Sensors and Actuators, 6(1984) 35–50.

Romppainen et al, "Effect of $CH_4$, $SO_2$ and NO on the CO Response of an $SnO_2$–Based Thick Film Gas Sensor in Combustion Gases," Sensor and Actuators, 8(1985) 271–279.

Schuetzle et al, "Fundamentals and Applications of Chemical Sensors," Ford Motor Co., ACS Symposium Series 309, American Chemical Society, Washington DC (1986), pp. 39–55.

Carruth, Jr. et al, "Measuring Flux Density of Monatomic Oxygen," NASA Tech Briefs, Jun. 1991, p. 50.

Gerrard et al, "Kryptonate–Based Instrument for Detecting Automobile–Exhaust Pollutants," Isotopes and Radiation Technology, vol. 8, No. 4, Summer 1971, pp. 403–408.

Jeffrey, A. Sell, "Tunable Diode Laser Measurements of Carbon Monoxide in Engine Exhaust," Physics Department, General Motors Corp., SPIE Proc. 438, 67 (1983), pp. 67–74.

SAE Handbook, vol. 1, Materials, Fuels, Emissions, and Noise, Cooperative Engineering Program, Published by Society of Automative Engineers, Inc., 400 Commonwealth Drive, Warrendale, PA 15096–0001 USA, pp. 13.104–13.112.

* cited by examiner

ON-BOARD DIAGNOSIS OF EMISSIONS FROM CATALYTIC CONVERTERS

FIELD OF THE INVENTION

This invention relates to systems for on-board diagnosis of emissions from catalytic converters, and more particularly to a system which stores exhaust emissions to thereafter be measured.

BACKGROUND OF THE INVENTION

Extensive changes have occurred recently in emission standards. Currently, federal and California standards for Tier I vehicles on the FTP test at 50K miles are the same (NMHC, 0.25 g/mi; CO, 3.4 g/mi; $NO_x$, 0.4 g/mi). California has also legislated a series of increasingly stringent emission standards in order to produce a fleet of lower emission vehicles, such as low emission (LEV) and ultra-low emission (ULEV) vehicles, with even lower emission standards, particularly for hydrocarbons. The government has also enacted regulations requiring that gasoline powered vehicles in MY94 in California (e.g., CARB Mailout #91-37) and MY96 in the other 49 states (Federal Register Vol. 58, #32, Feb. 19, 1993) be able to self-diagnose a malfunction by any of several components of the emissions control system. Under more recent regulations (e.g., CARB Mailout #94-03) the on-board diagnostics (OBD II) system needs to identify deterioration that is severe enough to exceed a threshold for the entire system. For California LEV and ULEV vehicles, the threshold is exceeded if the amount of non-methane hydrocarbon (NMHC, henceforth just HC) emitted in the exhaust during an FTP test (i.e., a test in which involves about 31.2 minutes of driving on a chassis dynamometer through a given speed-time schedule that covers the equivalent of 11 miles) exceeds 1.5 times the standard under which the vehicle was certified.

Current OBD II regulations require that each component of the emissions control system be checked during each trip to ensure that it functions properly. The most difficult component to check on-board is the catalytic converter. To check the catalytic converter, the environmental regulators originally suggested the dual oxygen-sensor method. The dual oxygen-sensor method is presently used by GM and all other car manufacturers since oxygen sensors are presently the only sensors available with proven durability in exhaust. However, even oxygen sensors have durability problems as described below.

Despite the wide use of the dual oxygen-sensor method, it has a fundamental problem: the quantity it measures is the oxygen storage capability of the catalytic converter, not its HC conversion efficiency. While it is possible to distinguish between a new catalytic converter and a completely inactive catalytic converter on the basis of oxygen storage, there is not a good correlation between oxygen storage capacity and the HC conversion performance of the catalytic converter for aged parts.

As performance requirements for the catalytic converter are increased to meet more stringent emissions regulations, it becomes impossible to use the dual oxygen-sensor method to distinguish between a catalytic converter that functions improperly and a good catalytic converter that simply has lost part of its oxygen storage. The use of fuel with high sulfur content has a much more severe effect on oxygen storage than on hydrocarbon conversion efficiency, for example. Also, it has been found that under conditions of normal use, the oxygen sensor downstream of the catalytic converter can change so that it responds more slowly to variation of the oxygen concentration than it did when it was new. This has the effect of allowing a malfunctioning catalytic converter to go undetected. Although this problem should be alleviated by software/hardware modifications, it is another difficulty of the existing method.

Vehicle certification relies on the FTP test, which involves about 31.2 minutes of driving on a chassis dynamometer through a given speed-time schedule that covers the equivalent of 11 miles. Today, in an FTP test of a properly functioning vehicle, of the total quantity of HC emitted, 60% to 80% is emitted in the first 2 minutes—before the catalytic converter has warmed up enough to reach 50% conversion efficiency (light off). As the catalytic converter deteriorates, the time to light off increases.

D. R. Hamburg, "Catalyst Monitoring Using a Hydrocarbon Sensor", U.S. Pat. No. 5,177,464 discloses a system that draws exhaust gas into a remote test chamber where HC concentration is measured. Two solenoid valves are used to control whether the exhaust sampled is taken from before or after the catalytic converter. If the ratio of HC concentration before and after the catalytic converter is not below a preset threshold the catalyst is indicated as being faulty. J. A. Cook, D. R. Hamburg, E. M. Logothetis, R. E. Soltis, J. H. Visser, and M. Zanini-Fisher, "Method and Apparatus for Determining the Hydrocarbon Conversion Efficiency of a Catalytic Converter, U.S. Pat. No. 5,265,417, describes a similar system in which a catalytic differential calorimetric sensor is used to determine the concentration of HC vapor.

SUMMARY OF THE INVENTION

The invention includes a system for collecting a representative sample of combustion engine exhaust hydrocarbons for some period of time. The amount of hydrocarbons collected is either measured continuously as the sample is collected or the total amount of hydrocarbons in the sample is measured some time later. The system reproducibly collects hydrocarbon samples from the exhaust to measure the quantity of collected hydrocarbons, and thereafter releases the hydrocarbons to renew a hydrocarbon collector to its original state.

These and other objects, features and advantages of the present invention will be apparent from the following brief description of the drawings, detailed description and appended claims and drawings.

DETAILED DESCRIPTION

The present invention is an on-board means to quantify the total amount of HC emitted by a vehicle during a predetermined time interval after it is started. We expect that this measurement, together with other information available to the engine control computer (ECC) during this time (such as the engine speed, the amount of fuel used, the mass air flow through the engine, and the temperature) will enable the engine computer to make an accurate decision as to whether on an FTP test that vehicle would be below 1.5 times the HC standard. In conjunction with enabling criteria based on information otherwise available to the ECC, the present invention may also be used to measure HC emissions during an acceleration or deceleration event, when emissions tend to be higher. This is another means to predict the vehicle's ability to pass an FTP test.

The basic idea of this invention is to collect a representative sample of the exhaust HC for some period of time. The amount of HC collected is either measured continuously as the sample is collected or the total amount of HC in the sample is measured at some later time. The outcome of this measurement is used to decide whether the vehicle would pass an FTP test. To implement this invention we need to reproducibly collect a HC sample from exhaust to measure the quantity of collected HC, and to renew the HC collector to its original state. A complication is that HC vapor is only a minor constituent (<1%) of exhaust gas. Additional constituents of exhaust gas are $\geq 10\%$ water vapor and another $\geq 10\%$ carbon dioxide. Also, the HC vapor in exhaust gas is actually a mixture of many different chemical species, each of which adsorbs or absorbs at a different rate on any particular substrate.

Figure 1:
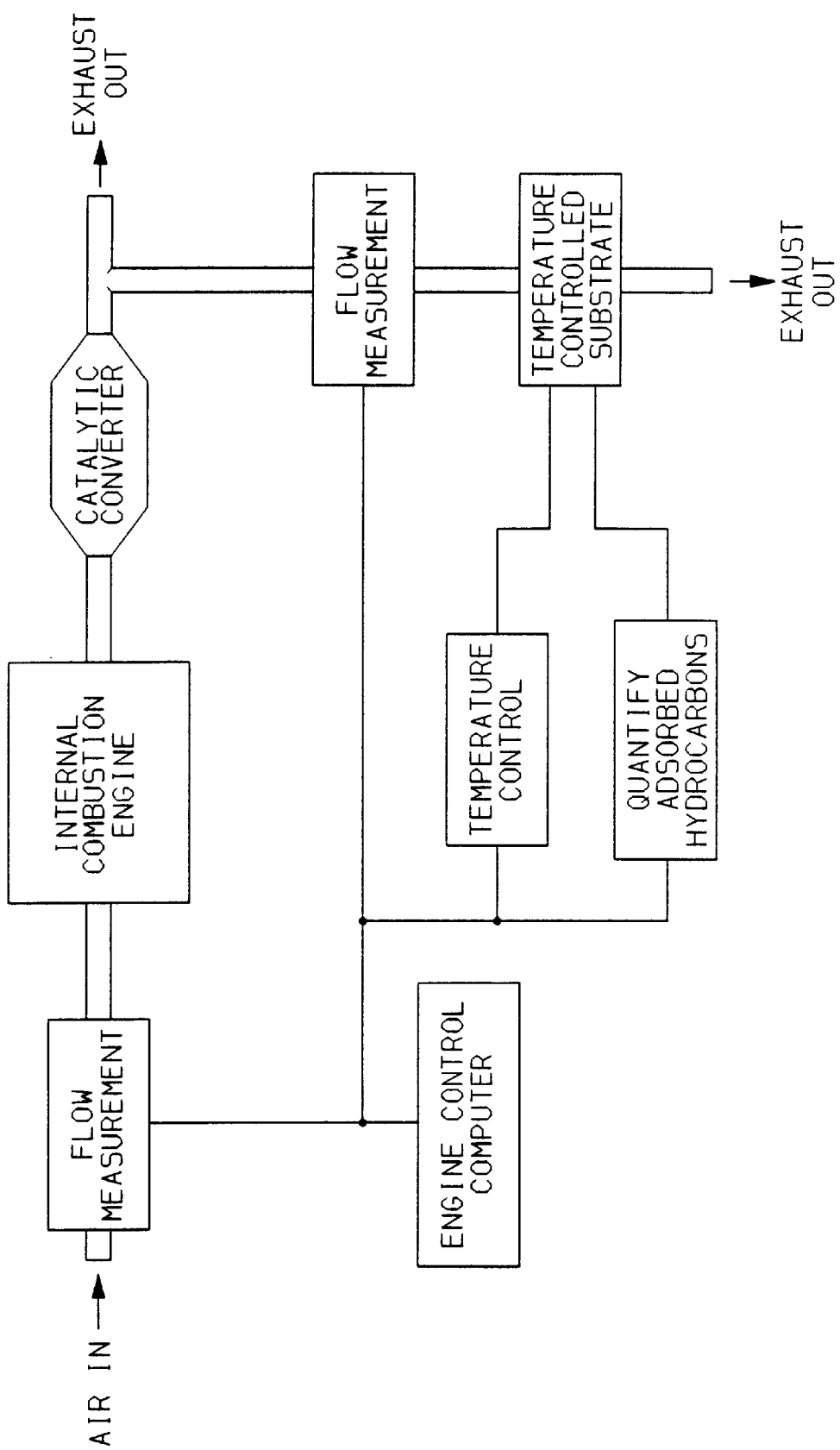
FIG. 1 is a schematic diagram illustrating an on-board diagnostic system according to the present invention.

FIG. 1 illustrates one such OBD system. A portion of the exhaust is directed through a by-pass where it passes over a substrate. The substrate is cool enough that part of the HC vapor is collected on the substrate. A means is provided to continuously measure the quantity of HC vapor so collected. The exhaust flow through the by-pass is measured. The air flow into the engine is also measured. (These flow measurements are intended to illustrate how the system works. They are not necessary in all embodiments of the present invention.) After the test is completed the substrate temperature is raised to remove the collected HC. The substrate is then allowed to cool in preparation for the next test.

To simplify the discussion, we first suppose that all measurements are perfectly accurate and can be performed as frequently as desired. For simplicity, we further suppose that the rate at which HC deposits on the substrate is $C_s \rho_{HC} I_s$ where $C_s$ is a constant, $\rho_{HC}$ is the concentration of HC in the exhaust and $I_s$ is the exhaust flow rate in the by-pass. The rate at which exhaust HC is emitted by the vehicle is $C_E \rho_{HC} I_E$ where $C_E$ is a constant and $I_E$ is the flow rate of air into the engine. When the test is started, the substrate begins in a clean state. At periodic time intervals, measurements are taken of the mass $M_{HC}$ of HC deposited on or in the substrate. Also, let $\Delta t$ be the delay between when air enters the engine and when it passes over the substrate. Then in the limit that $t_B - t_A$ is small, the amount $Q(t_A)$ of HC exhausted between times $t_A - \Delta t$ and $t_B - \Delta t$ is $$Q(t_A) = \frac{c_E I_E(t_A - \Delta t)[M_{HC}(t_B) - M_{HC}(t_A)]}{c_s I_s(t_A)}. \quad (1)$$

The total amount $Q_T$ of HC emitted from the beginning of the test at time $t_1$ until the end of the test at $t_F$ is $$Q_T = Q(t_1) + Q(t_2) + \ldots + Q(t_F). \quad (2)$$

At the end of the test, the substrate is renewed to its original state so that the test can be repeated. One approach to renew the substrate is to heat it to a high enough temperature that most of the HC desorbs. The substrate is then allowed to cool down in preparation for the next test.

In general, the rate at which HC is deposited on the substrate is proportional to $\rho_{HC}$ but not necessarily to $I_s$. In addition, the rate at which HC is deposited on a substrate will in general depend upon the substrate temperature $T_s$ and the amount $M_{HC}$ of HC already collected. Consequently, a more general form of Eq. (1) is:

$$Q(t_A) = f(T_s(t_A), M_{HC}(t_A), I_s(t_A)) \cdot [M_{HC}(t_B) - M_{HC}(t_A)]. \quad (3)$$

Here $f(T_s, M_{HC}, I_s)$ is a calibration function.

Now, suppose that the exhaust sampling system is arranged so that to a good approximation, $I_s$ $I_E$ so their ratio in Eq. (1) is constant, independent of time. Also, suppose that $C_s$ is constant during the test. Then the total quantity of HC collected is proportional to $Q_T$, the quantity we wish to use to decide whether the vehicle would be able to pass an FTP test. The threshold value of collected HC to distinguish between pass or fail of the FTP test would be determined by calibration.

We note that the desirability of an exhaust sampling system with $I_s$ $I_E$ has been recognized previously. Such a system, based on a hot wire anemometer in the exhaust that measures $I_E$ and a mass-flow controller that actively controls $I_s$ so the two quantities are slaved together, has been demonstrated: J. McLeod, D. Nagy, P. Schroeder, S. Thiel, M. S. Dearth, A. D. Colvin, T. Webb, K. R. Carduner, D. Schuetzle, R. Middleton, and A. M. Schlenker, "A Sampling System for the Measurement of Precatalyst Emissions From Vehicles Operating Under Transient Conditions," SAE paper 930141. However, it is also possible to design a ducting system so the flow rate in a by-pass is to good approximation proportional to the flow rate in the main flow channel. An example of this is the by-pass duct in a mass air flow sensor that is widely used to measure engine air intake: T. Sasayama, T. Hirayama, M. Amano, S. Sakamoto, M. Miki, Y. Nishimura, and S. Ueno, "A New Electronic Engine Control System Using a Hot-Wire Air Flow Sensor," SAE paper 820323; and T. Sasayama, Y. Nishimura, S. Sakamoto, and T. Hirayama, "A Solid-State Air Flow Sensor for Automotive Use," Sensors and Actuators 4, 121 (1983).

Figure 2:
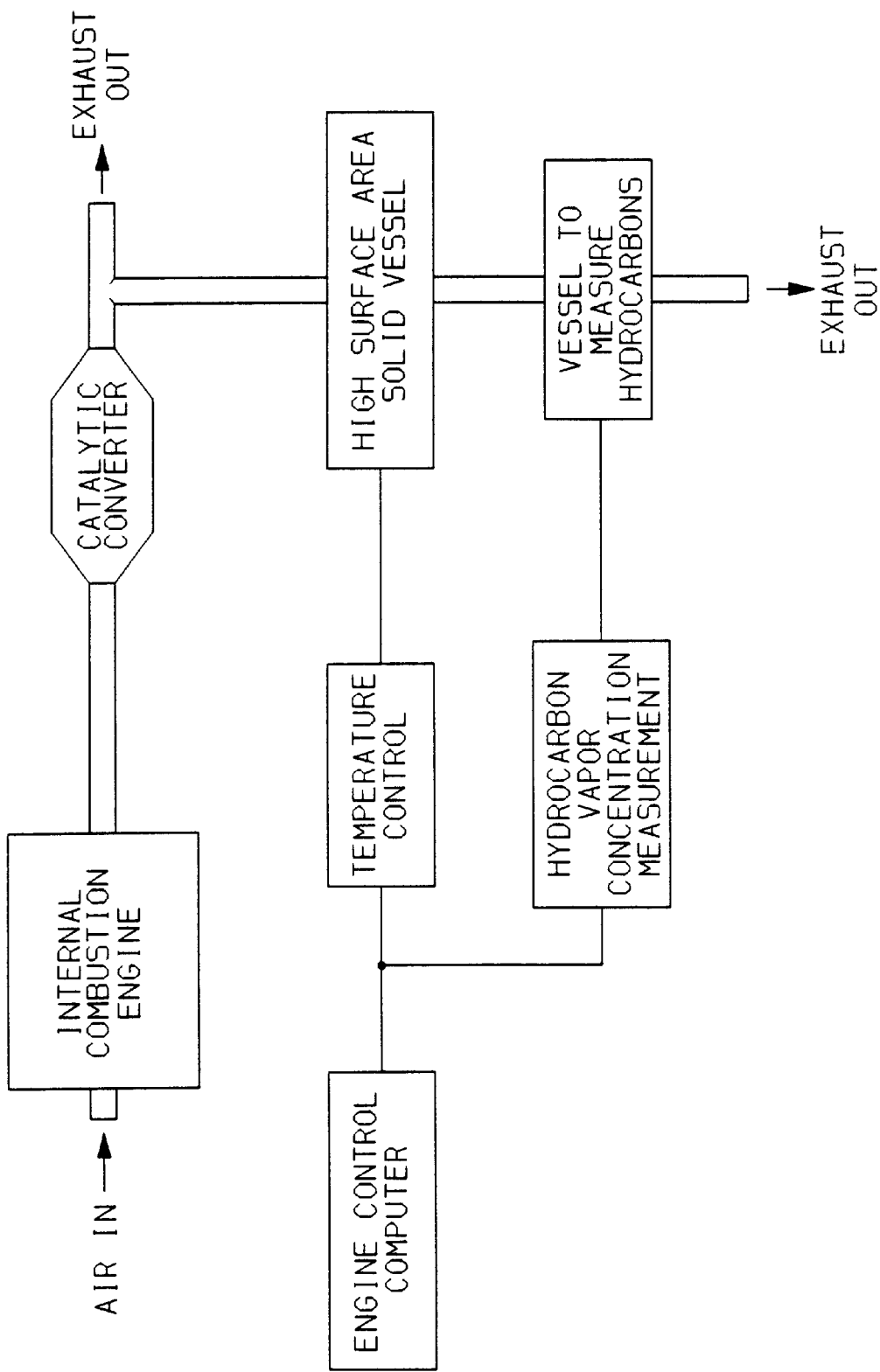
FIG. 2 is a schematic diagram illustrating an on-board diagnostic system according to the present invention wherein exhaust hydrocarbons are collected on a high surface area solid for testing and released thereafter upon heating the solid.

We next discuss specific embodiments of our invention. The embodiment of FIG. 2, collects the exhaust HC by adsorbing or absorbing it on a high surface area solid in a container. Alternatively, both the water and the HC vapor could be condensed in the collector. The collection could, for example, take place in a small charcoal canister similar to that presently used to capture HC fuel vapor on-board during refueling. At the end of the test, the canister temperature is raised. The increase in temperature could be caused by electrical heating. The increase in temperature could also be caused by thermal conduction from the warm exhaust gas. This causes most of the HC to be vented as HC vapor mixed with air. The quantity of HC that is vented is detected with a HC detector. One possible HC detector is a calorimetric detector with two elements, one coated with a catalyst that causes HC vapor to react with oxygen and produce heat, the other not coated with a catalyst, that acts as a reference. Another possible HC vapor detector is a solid-state device that measures the thermal conductivity of the ambient gas. Another possible HC vapor detector is a device that simply measures the pressure rise in the collection chamber. Another possible HC vapor detector is a device that measures the index of refraction of the vapor as it is expelled from the chamber. Another possible HC vapor is an infrared spectrometer. After the HC vapor has been expelled from the collector (or at the end of the trip) the container is allowed to cool back down in preparation for the next test.

Since the time dependence of $M_{HC}$ is not measured in this embodiment, for an accurate determination of $Q_t$ it is necessary that to a good approximation the flow $I_s$, in the by-pass be proportional to the total exhaust flow, which in turn is proportional to $I_E$. It is also important that the fraction of HC passing through the by-pass that is collected be time independent during the test. In reality, the fraction collected is likely to depend to some extent on the temperature, which will vary, but temperature can be measured and accounted for in making the decision. Even if the flow in the by-pass is not proportional to the flow in the main stream it may still be possible to use this approach. The air-to-fuel ratio is controlled by measuring the mass air flow $I_E$ into the engine, so this quantity is available to the engine control computer (ECC) already. The flow $I_s$ through the by-pass is a function of $I_E$. SO the ratio of these two quantities in Eq. (1) is known as a function of time. A model can also be used to estimate the time dependence of $M_{HC}$. By accounting for these sources of variation, $Q_T$ can estimated to decide whether the vehicle would be able to pass an FTP test for HC.

Figure 3:
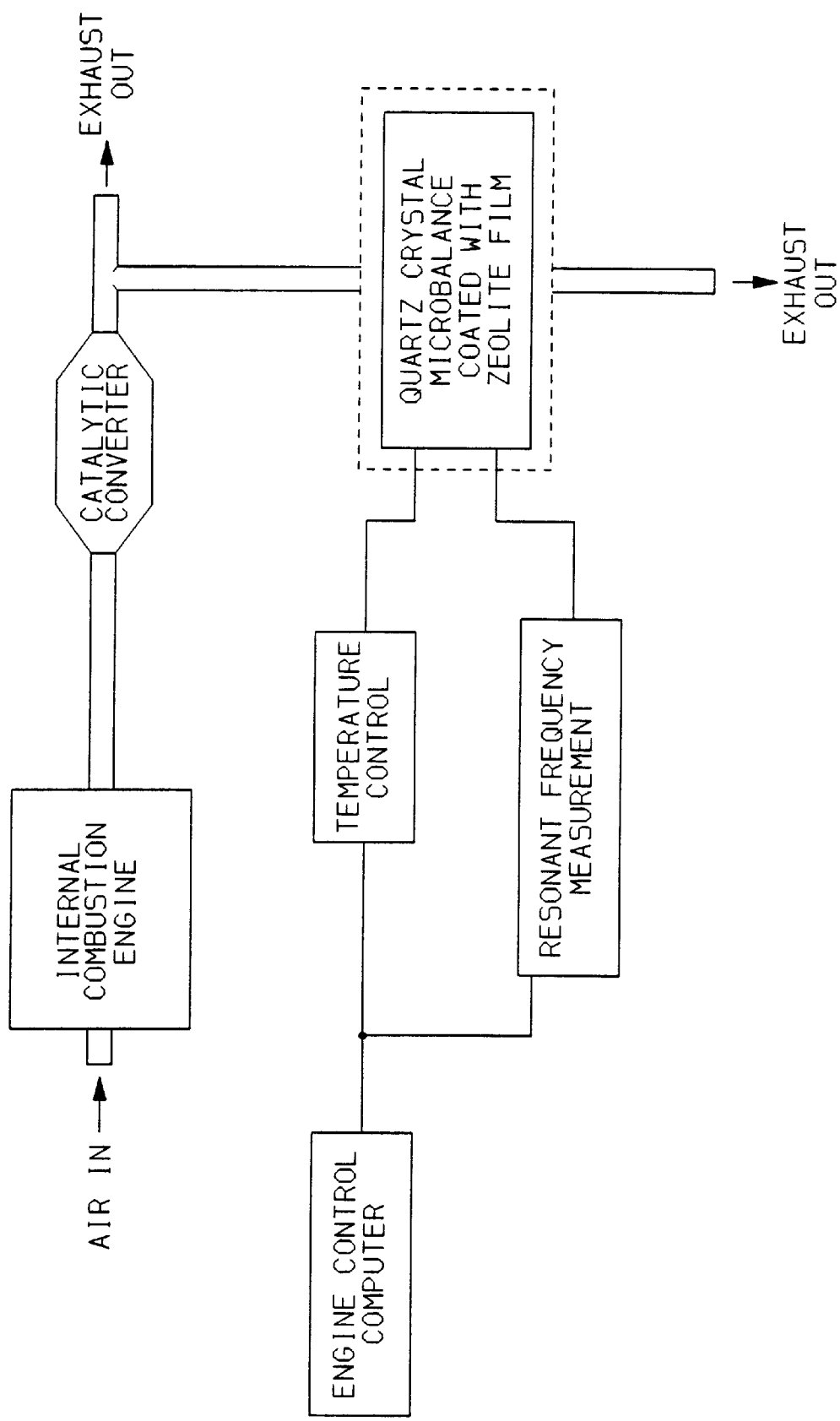
FIG. 3 is a schematic diagram illustrating an on-board diagnostic system according to the present invention in which exhaust hydrocarbons are collected on a zeolite film on a quartz crystal microbalance for testing and released from the film by heating the film thereafter.

In a second embodiment, shown in FIG. 3, the HC vapor is adsorbed on a zeolite film that coats a quartz crystal microbalance. Such a device is described in: Y. Yan and T. Bein, "Molecular Recognition on Acoustic Wave Devices: Zeolite Thin Films Coated with Organosilane Gate Layers," Microporous Materials 1 (1993) 401. The film is chosen so that it selectively adsorbs HC in preference to the other constituents of exhaust gas. In one approach the film is maintained at a high enough temperature that water vapor does not adsorb to an appreciable extent, but at a temperature low enough that some of the important HC species in the exhaust do adsorb. Measurements of $M_{HC}$ are made. Since $M_{HC}$ is measured as a function of time, it is in principle possible to use Eq. (3) instead of Eq. (2) with this method. After the test, the film is renewed by heating to a high enough temperature to desorb the HC.

Figure 4:
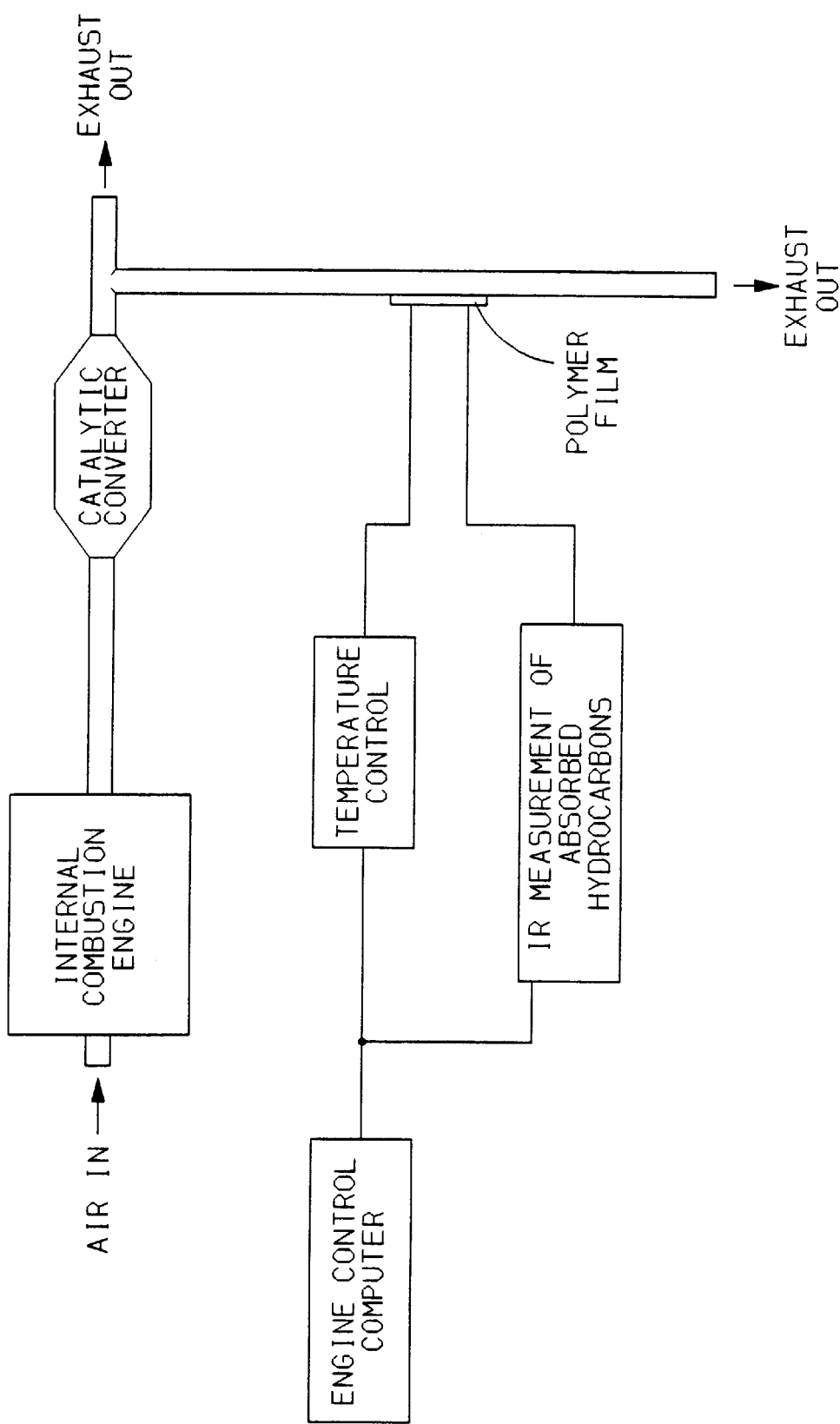
FIG. 4 is a schematic diagram illustrating an on-board diagnostic system according to the present invention in which exhaust hydrocarbons are absorbed on a polymer film on an infrared transparent substrate for testing with infrared spectroscopy and released thereafter by heating the film.

In a third embodiment, shown in FIG. 4, the HC vapor adsorbs on a high surface area film that coats an infrared transparent substrate. Infrared reflection spectroscopy in the substrate is used to monitor $M_{HC}$. Alternatively, the attenuated total internal reflectance technique can be used to measure the quantity of adsorbed HC on a substrate or absorbed in a film that coats the substrate. This has the advantage that the infrared beam path and all of the optical elements (except the film) are protected from the harsh exhaust gas environment. This approach has been used to detect HC in water. Again, since $M_{HC}$ is measured continuously, it is possible to use Eq. (3) instead of Eq. (1) with this method. After the test, the film is renewed by heating to a high enough temperature to desorb the HC.

Figure 5:
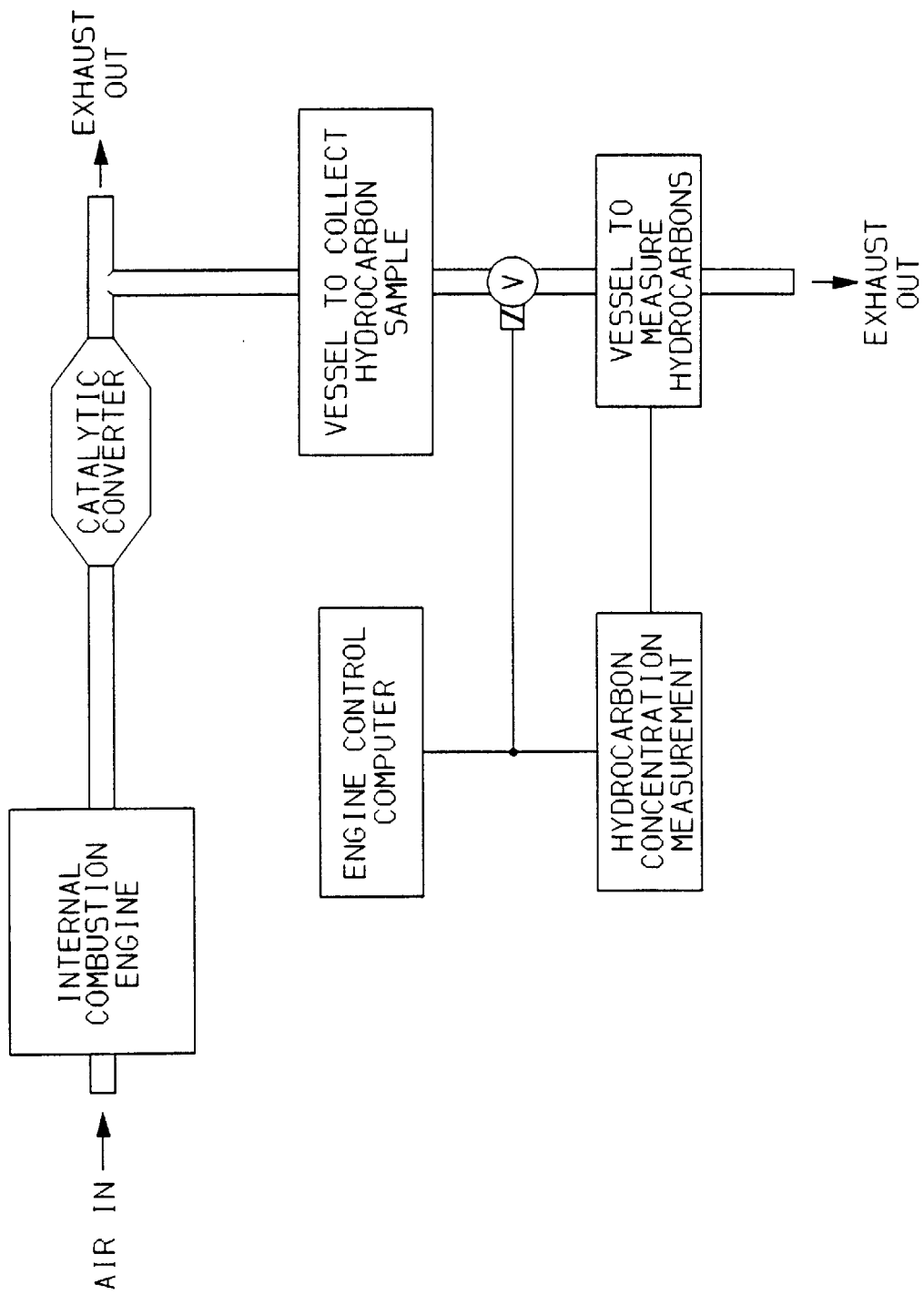
FIG. 5 is a schematic diagram illustrating an on-board diagnostic system according to the present invention in which exhaust hydrocarbon vapor is collected in a vessel for testing and thereafter released by opening a solenoid valve.

In a fourth embodiment, shown in FIG. 5, the HC is collected as a vapor in a vessel. After collection, the HC vapor is sent to the location of a HC sensor for measurement by evacuating the vessel. After detection, the vessel is prepared for the next test by being evacuated or exposed to ambient air.

Figure 6:
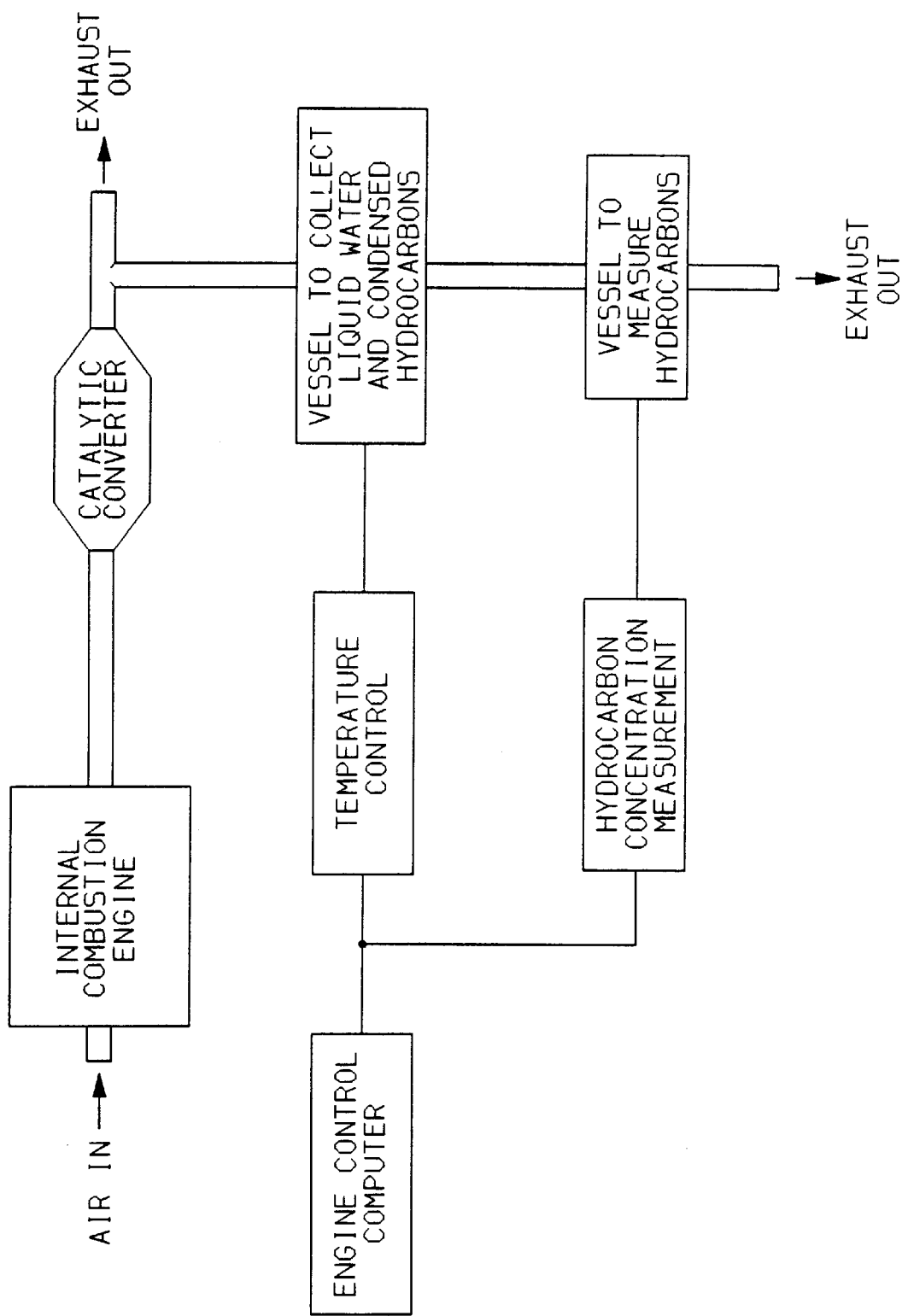
FIG. 6 is a schematic diagram illustrating an on-board diagnostic system according to the present invention in which exhaust hydrocarbons are collected along with condensed water for testing and thereafter released by heating to vaporize the hydrocarbons in water.

In a fifth embodiment, shown in FIG. 6, both the HC vapor and the water are collected as HC dissolved in liquid water. At the end of the test, the entire sample of water and dissolved HC is heated until it all vaporizes. The vapor is sent to a HC sensor for measurement. We note that it may also be possible to quantify the dissolved HC in the water either by direct measurement or by monitoring the temperature versus time of the container during the evaporation.

With appropriate enabling criteria (or the addition of a sensor in front of the catalytic converter), this invention could be used to do a component check on the catalytic converter. However, one additional advantage of the present invention over the dual oxygen-sensor approach is that it can check the functionality of the exhaust emissions control system as a system, as opposed to checking each component individually as is done now. The regulations can now be met with a single system diagnostic and such a diagnostic has the potential to replace many component diagnostics. Also, a system diagnostic is expected to generate fewer false alarms which will lead to greater reliability and increased customer satisfaction. Finally, if used from cold start, this invention is an on-board test that closely approximates taking a bag sample in an FTP test.

What is claimed is:

1. A method for on-board diagnosis of emissions from a catalytic converter operatively connected to an internal combustion engine of a motor vehicle, comprising:

sampling a first portion of engine exhaust from the catalytic converter, where a remainder of the engine exhaust passes simultaneously from the motor vehicle;

adsorbing hydrocarbons from the portion of the engine exhaust onto a temperature controlled substrate;

electrically heating the substrate, thereby vaporizing substantially all of the hydrocarbons on the substrate;

quantifying the amount of hydrocarbons released from the substrate; and determining a malfunction in the catalytic converter when the amount of hydrocarbons exceeds a predetermined threshold.

2. The method of claim 1 further comprises the steps of:

controlling the temperature of the substrate so that the first portion of engine exhaust are stored for a period of time; and sampling a second portion of engine exhaust from the catalytic converter prior to vaporizing the hydrocarbons on the substrate.

3. The method of claim 1 wherein the substrate comprises a high surface area solid.

4. The method of claim 1 wherein the substrate comprises at least one of a quartz crystal microbalance coated with a zeolite film and a polymer film.

5. The method of claim 1 wherein the step of quantifying the amount of hydrocarbons further comprises using a hydrocarbon sensor.

6. The method of claim 5 wherein the hydrocarbon sensor is at least one of a calorimetric detector and an infrared detector.

7. A method for on-board diagnosis of emissions from a catalytic converter operatively connected to an internal combustion engine of a motor vehicle, comprising:

sampling a portion of engine exhaust from the catalytic converter, where a remainder of the engine exhaust passes simultaneously from the motor vehicle;

adsorbing hydrocarbons from the portion of the engine exhaust into a temperature controlled substrate;

quantifying the amount of hydrocarbons adsorbed onto the substrate;

electrically heating the substrate, thereby vaporizing substantially all of the hydrocarbons on the substrate;

determining a malfunction in the catalytic converter when the amount of hydrocarbons exceeds a predetermined threshold;

controlling the temperature of the substrate so that the first portion of engine exhaust are stored for a period of time; and sampling a second portion of engine exhaust from the catalytic converter prior to quantifying the hydrocarbons on the substrate.

* * * * *